United States Patent

[11] 3,624,439

| [72] | Inventor | Kiyoshi Tokutomi |
|---|---|---|
| | | 490 N. 8th St., San Jose, Calif. 95112 |
| [21] | Appl. No. | 54,190 |
| [22] | Filed | July 13, 1970 |
| [45] | Patented | Nov. 30, 1971 |

[54] ELECTROMECHANICAL ENERGY CONVERTER WITH LOW-INERTIA SPECIALLY WOUND COIL
18 Claims, 11 Drawing Figs.

[52] U.S. Cl. .................................................. 310/154, 310/181, 310/185, 310/203
[51] Int. Cl. ............................................... H02k 21/26
[50] Field of Search............................................ 310/154, 156, 181, 185, 179, 184, 180, 204, 205, 207, 206, 202, 203

[56] References Cited
UNITED STATES PATENTS

| 3,535,573 | 10/1970 | Appleton | 310/207 |
| 1,648,564 | 11/1927 | Pattay | 310/156 |
| 2,989,654 | 6/1961 | Neyhouse | 310/203 |
| 2,722,617 | 11/1955 | Cluwen | 310/154 |
| 2,830,207 | 4/1958 | Clark | 310/154 |
| 2,060,259 | 11/1936 | Spengler | 310/156 |
| 2,230,878 | 2/1941 | Bohli | 310/156 |
| 1,101,384 | 6/1914 | Auvert | 310/203 |
| 3,426,226 | 2/1969 | Frank | 310/202 |

FOREIGN PATENTS

| 773,545 | 4/1957 | Great Britain | 310/154 |

*Primary Examiner*—William H. Beha, Jr.
*Assistant Examiner*—R. Skudy
*Attorney*—Charles L. Botsford

ABSTRACT: An electromechanical energy converter with low-inertia, coreless, nonmagnetic coils rotating in fields of high-magnetic flux provided by pairs of magnetic rows having connected like poles facing connected unlike poles provides increased output energy for a given input energy.

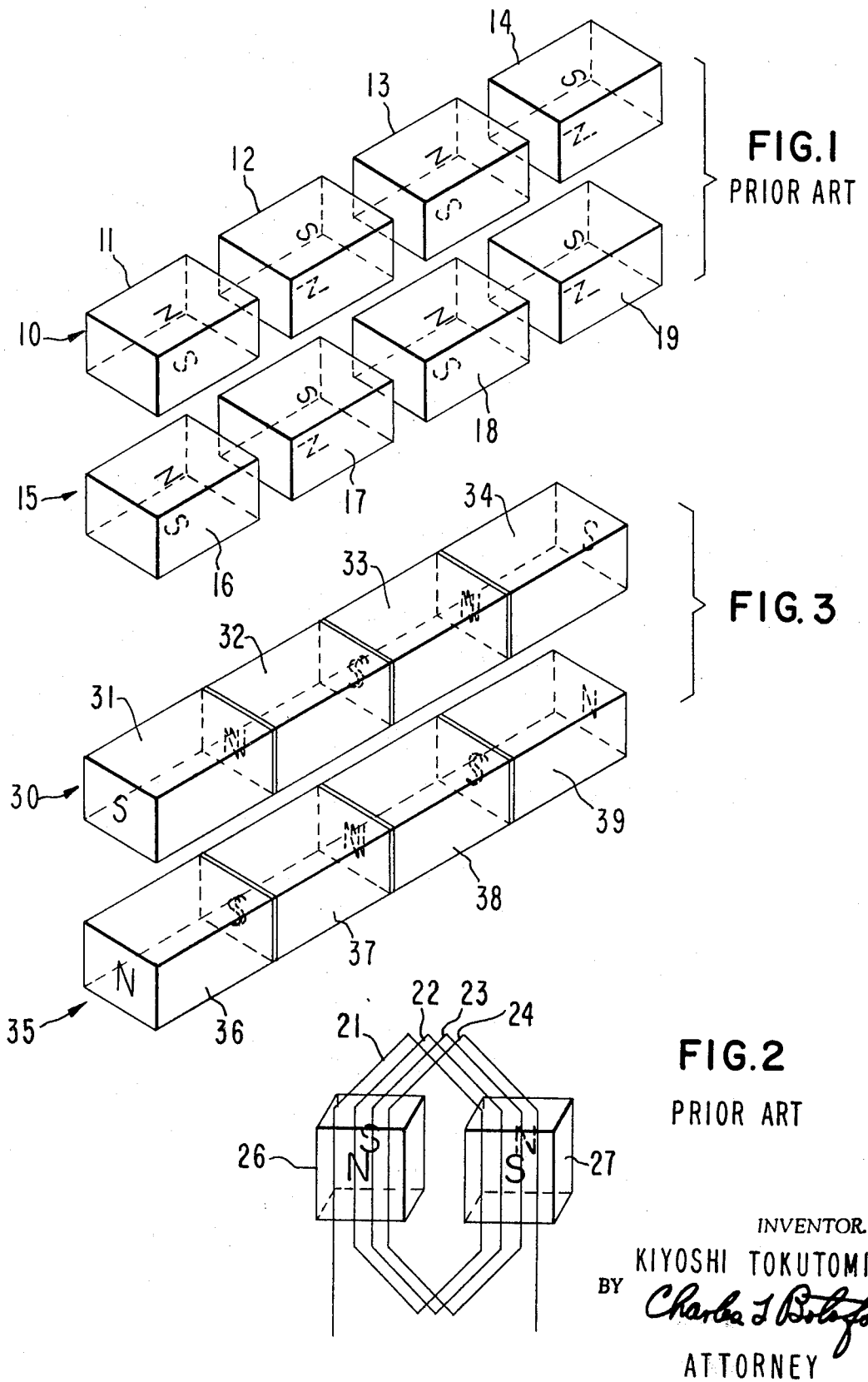

INVENTOR.
KIYOSHI TOKUTOMI
BY
*Charles L. Botsford*
ATTORNEY

INVENTOR.
KIYOSHI TOKUTOMI
BY Charles L Botsford
ATTORNEY 3,624,439

ELECTROMECHANICAL ENERGY CONVERTER WITH LOW-INERTIA SPECIALLY WOUND COIL

BACKGROUND OF THE INVENTION

1. Field of the Invention

This invention relates to electromechanical energy converters such as, for example, alternating-current or direct-current motors or generators. In particular, this invention relates to low inertia electromechanical energy converters having a coreless, nonmagnetic coil rotating through a field of high-magnetic flux provided by a plurality of connected like poles facing connected unlike poles, that is, connected poles of opposite polarity.

2. Description of the Prior Art

Previously, the magnetic field in an electrical motor or generator has been provided by one or more spaced rows of magnets with the pole of a magnet in one row facing the opposite pole of another magnet in the other row, that is, the N pole of a magnet in row one faces the S pole of a magnet in row two. Magnetic flux is created between the two poles in the space separating the two rows, with the flux direction determined by orientation of the N and S poles. When a conductive wire is moved through the magnetic field, electrical current is generated. Efficiency of the generator or motor is increased when the row, or rows, of magnets are in a circular pattern, such as a hollow cylinder, and the wire in the form of a coil rotates therein. For operation with alternating current, it is desirable that the poles of the magnets in a row alternate from N to S, so that the direction of magnetic flux is reversed repeatedly as the coil moves through the magnetic file. By using iron-coreless special would coil, the invention is designed to generate high current electricity more efficiently.

According to the invention, like poles of adjacent magnets in one row are connected together and face connected unlike poles of adjacent magnets in a second row, that is connected N poles face connected S poles, or a like pole which is regarded electrically as connected like poles faces an unlike pole, which is also regarded electrically as connected unlike poles for the coil.

Preferably, the coil comprises a plurality of smaller coils, each being of a width that corresponds to the length of two connected magnets. Moreover, each individual coil is formed so that its inner loops overlap the connected like poles of two magnets while its outer loops extend to overlap the unlike poles at the other end of the two magnets.

BRIEF DESCRIPTION OF THE DRAWINGS

FIG. 1 is a simplified isometric drawing of a typical prior-art approach wherein two magnetic rows are aligned so that spaced magnets in each row alternate between like and unlike poles, with like poles in one row facing unlike poles of the second row.

FIG. 2 is a simplified isometric drawing of a typical prior-art coil wherein each loop thereof overlies both a like and an unlike pole.

FIG. 3 is a simplified isometric drawing of two rows of magnets wherein connected like poles in one row face connected unlike poles in another row.

DESCRIPTION OF THE PREFERRED EMBODIMENTS

Figure 4:
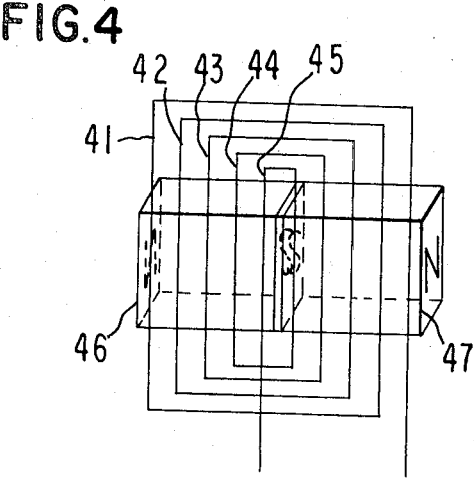
FIG. 4 is a simplified isometric drawing of a coil of a width corresponding to the length of two connected magnets, with the inner loops thereof overlying connected like poles and the outer loops thereof overlying the unlike poles.

Referring to FIG. 1, a typical prior-art configuration is shown. It comprises a pair of spaced magnetic rows 10 and 15. Each row comprises a plurality of spaced magnets 11 to 14 or 16 to 19, and aligned so that the like an unlike poles alternate within a row. For example, the S pole of magnet 11 in one row 10 faces the other row 15, whereas the N pole of adjacent magnet 12 faces the other row 15. The magnets are also aligned so that each S pole in row 10 faces an N pole in row 15, and each N pole in row 10 faces an S pole in row 15.

Magnetic flux is created in the separation between the S pole of magnet 11 in row 10 and the N pole of magnet 16 in row 15, and so forth.

Referring to FIG. 2, a typical coil of prior-art converters is shown. Each loop 21 to 24 of the coil overlies both the S pole of one magnet 26 and the N pole of an adjacent magnet 27.

REferring to FIG. 3, a pair of magnetic rows 30 and 35 are shown. Each row comprises a plurality of magnets 31 to 34 for row 30 and 36 to 39 for row 35. Each of the magnets within a row are aligned so that like poles are connected together, that is, the N pole of one magnet, such as magnet 32, is connected to the N pole of an adjacent magnet, such as magnet 31, while the S pole of magnets 32 is connected to the S pole of magnet 33.

The magnets in each row are also oriented so that both poles of each magnet face the other magnetic row, with connected like poles facing connected unlike poles, that is, the connected N poles of magnets 31 and 32 face connected S poles of magnets 36 and 37.

Because like poles are connected, a repelling force is created therebetween. The connected magnets are thus firmly fastened together by bolting, screwing, bonding, and so forth, provided the method selected for fastening the magnets does not affect the magnetic properties thereof (that is, the method should be nonmagnetic).

Moreover, the repulsive force created when like poles are connected together means that the flux in the vicinity of the connection is highly concentrated and points towards the corresponding connected unlike poles in the other row. This high concentration of magnetic flux due to the connected like poles is in addition to the flux created by the side of a magnet in one row facing the side of a corresponding magnet in the second row.

Whenever an electrically conductive material, such as a coil of copper wire, is moved through the magnetic flux between the two rows 30 and 35, electrical current is generated within the wire. The generated current is of a magnitude that is proportional to the flux concentration, the velocity of the wire, and the angle of the wire with respect to the direction of the flux.

Moreover, since the connected poles alternate and the resulting flux therebetween changes direction as the coil moves through the space separating the two magnetic rows, the current generated in the coil also changes direction in response to the changing direction of the magnetic flux. Alternating current is thus generated.

Referring to FIG. 4, a typical coil according to the invention comprises a plurality of loops 41 to 45 wound, for example, in a clockwise direction, with inside loops 44 and 45 overlying connected like poles of two magnets, such as the connected S poles of magnets 46 and 47. The outside loops 41 and 42 of the coil overlie the other poles of the same two magnets, such as the N poles of magnets 46 and 47.

The coil is of a width that corresponds to and is substantially the same as the length of the two adjacent connected magnets. Note that the direction and method of winding each of the loops and the width of the coil as described above provide for current flow in one direction through the coil, even though the direction of flux changes as each loop moves from the N to the S pole, and vice versa.

Figure 5:
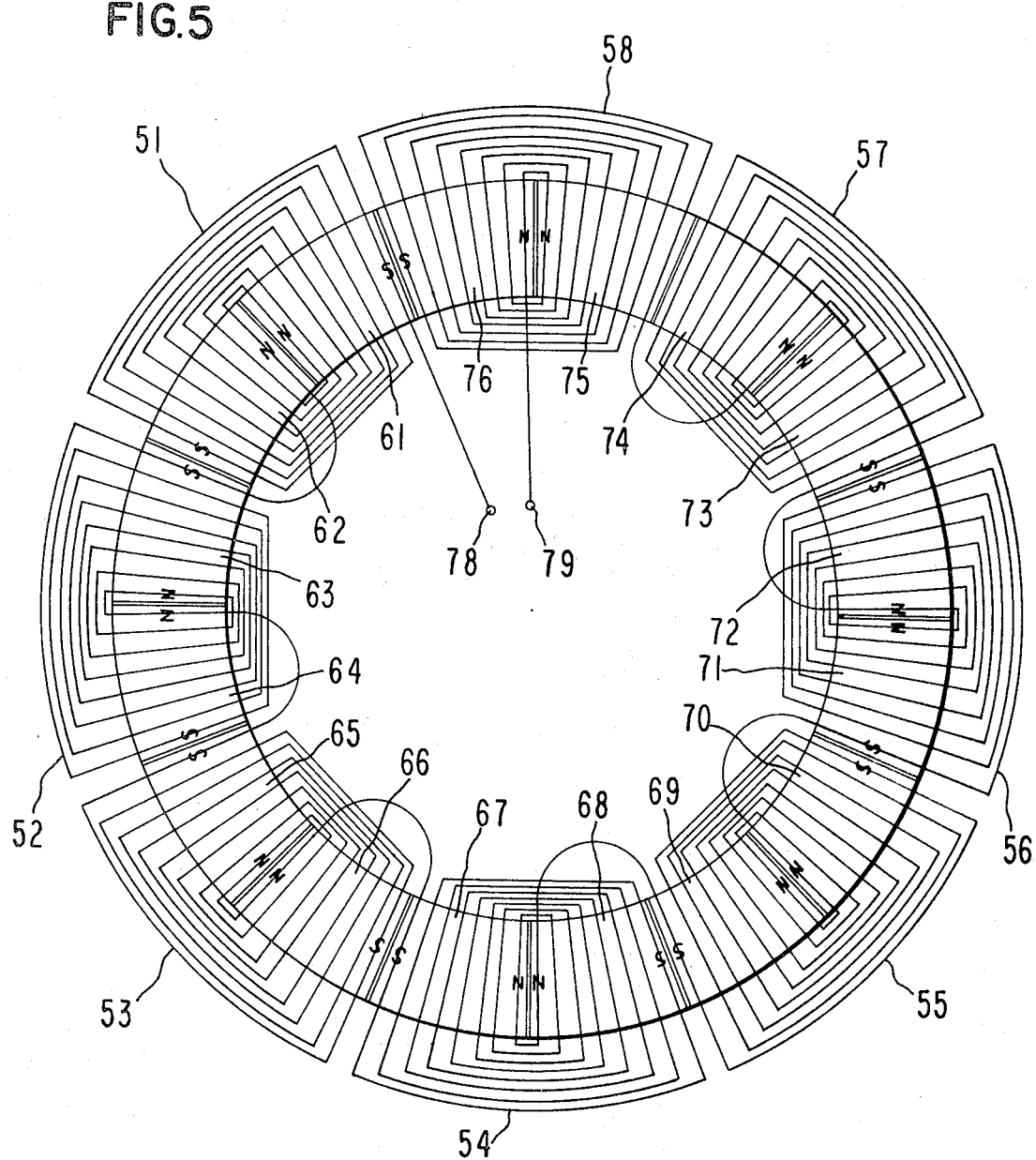
FIG. 5 is a simplified cross-sectional view of a coil comprising a plurality of smaller coils overlying a circular row of magnets having connected like poles, with the width of each smaller coil corresponding to the length of two connected magnets.

Referring to FIG. 5, the coil comprises a plurality of smaller coils 51 to 58, and overlies a row of connected magnets 61 to 76. Each of the smaller coils is of a width that corresponds to and is substantially the same as the length of the two connected magnets in a row; for example, coil 51 overlies connected magnets 61 and 62. Each smaller coil is wound such that the inside loops overlie two connected like poles, and the outer loops overlie the other poles of the same magnets. For series operation, the output terminals of each of the smaller coils 51 to 58 are coupled in series. One end of the major coil is connected to an output terminal 78 and the other ends is connected to another output terminal 79.

As the major coil rotates through the magnetic field created by the connected magnets, alternating current is generated in the coil because of the repeated change in the direction of the magnetic flux. The width of each of the smaller coils and the method in which the loops are wound as described above provides for current flow in one direction throughout the coil.

It shall be appreciated, however, that each of the smaller coils 51 to 58 can be connected in parallel rather than in series, so that there is no interconnection between each of the smaller coils. For parallel operation, one can tap off the current generated in each smaller coil, or, if desired, the smaller coils can share a pair of common output terminals, such as terminals 78 and 79. With the latter configuration, a pair of output wires for each smaller coil is coupled to terminals 78 and 79.

Figure 6:
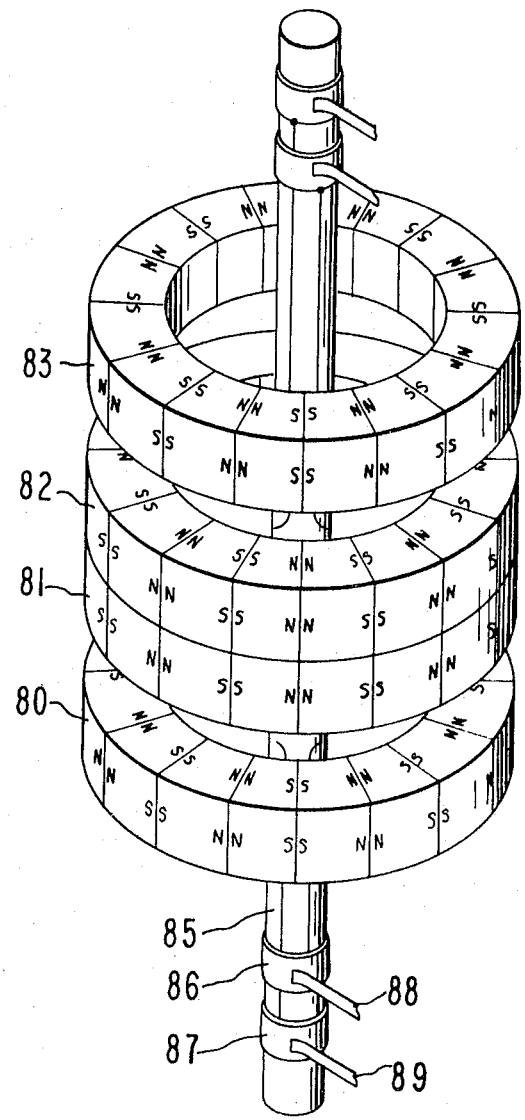
FIG. 6 is a simplified isometric representation of two pairs of adjacent magnetic rows, wherein connected like poles of magnets in one row face connected unlike poles of magnets in another row.

Referring to FIG. 6, a plurality of pairs of magnetic rows 80 to 83 are assembled together. Each row comprises a plurality of magnets with like poles connected together and facing connected unlike poles in the other row. The magnets are firmly connected with a force sufficient to overcome the repelling force between like poles as described previously (that is, by bolting, screwing, bonding with a nonmagnetic material, and so forth).

The magnets in each of the rows are of a relatively uniform cross-sectional area and suitably of a shape that allows formation of a cylinder.

Each of the rows of a particular pair are spaced apart to allow a coil to rotate therebetween. For example, a coil similar to that shown in FIG. 5 is inserted in the separation between rows 80 and 81 and attached to a shaft 85. As the shaft 85 turns and the coil rotates between the two rows, electrical energy in the form of potential and current is generated in the coil. Typically, the rotating coil is the rotor and the fixed magnetic rows are the stator of a generator.

Electrically conductive wires extend along the shaft 85 from the coil output terminals (shown in FIG. 5) to a pair of collector rings, 86 and 87, one pair for each coil. A pair of brushes 88 and 89 are provided, one pair for each coil, which allows one to tap off electrical current generated in the rotating coil and transmitted to the rings 86 and 87. Note that if parallel rather than series operation is desired, either a pair of collector rings and brushes are provided for each smaller coil, or a pair of common terminals as described above are used.

Figure 7A:
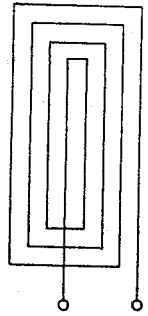
FIG. 7 is a simplified schematic diagram of alternative coils.
Figure 7B:
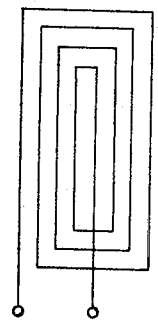
Figure 7C:
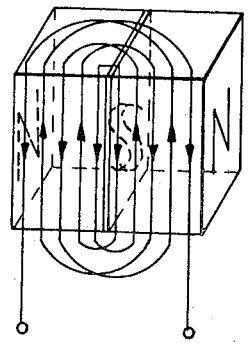

Referring to FIG. 7A through 7C, several alternative approaches to the coil are shown. In FIG. 7A, the loops of the coils travel from inside to outside in a clockwise direction, whereas in FIG. 7B, the loops travel from inside to outside in a counterclockwise direction. The two approaches of FIGS. 7A and 7B can be combined as shown in FIG. 7C wherein the loops go in both a clockwise and a counterclockwise direction starting from the center of the coil and cross each other at both the top and bottom of the coil. For purposes of illustration, a pair of magnets with connected like poles are shown behind the coil.

Problems due to high current in the coil, such as overheating and shorting, are prevented by keeping the coil cool. Air or water techniques as known in the art are suitable. Also, using a parallel configuration for each of the smaller coils, rather that the described series connection, allows one to keep the magnitude of the generated current at a lower level by tapping off the current in each smaller coil either via a common output terminal or by use of a separate pair of output terminals for each smaller coil, as described above.

While the invention has been described with reference to electrical generators, it may also be applied to electrical motors or other electromechanical energy converters with suitable alterations which will be obvious to one skilled in the art without departing from the scope of the invention.

It is also with the scope of the invention to vary the winding of the coil by other methods or configurations which will be obvious to one skilled in the art.

Furthermore, although the invention has been described with emphasis on permanent magnets, it is within the scope of the invention to use electromagnets with connected like poles facing connected unlike poles.

Figure 8:
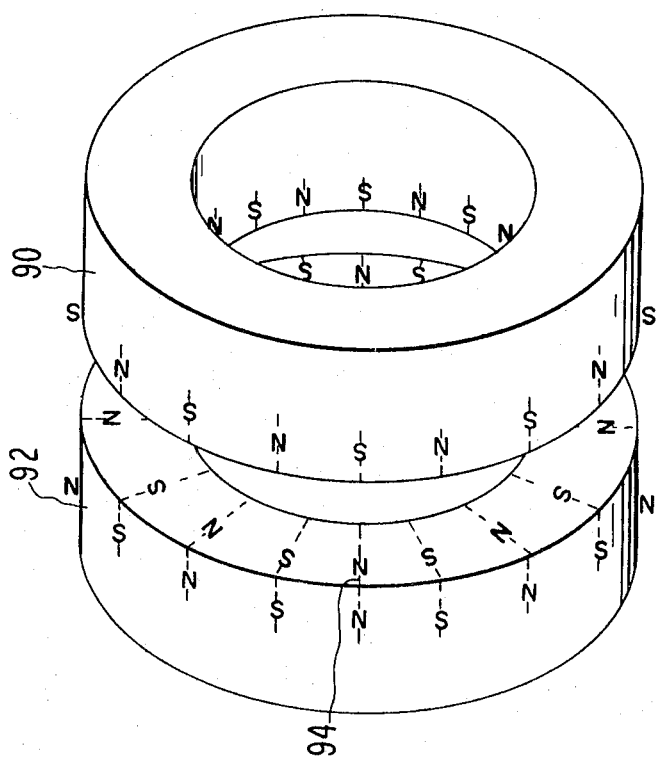
FIG. 8 is a simplified isometric drawing of a pair of adjacent multiple pole ring magnets aligned so that like poles face unlike poles.
Figure 9:
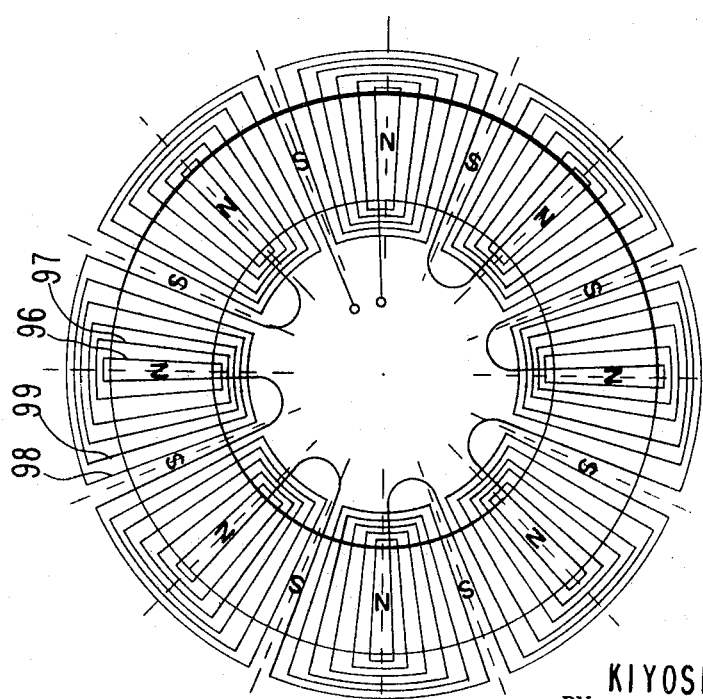
FIG. 9 is a simplified cross-sectional view of a coil comprising a plurality of smaller coils overlying a multiple pole ring magnet, with the width of each smaller pole corresponding to the width between three adjacent poles.

Moreover, referring to FIG. 8, it is within the scope of the invention to use a plurality of pairs of spaced multiple pole ring or rotor magnets, such as magnets 90 and 92, rather than separate individual magnets. Ring magnets 90 and 92 are aligned so that like poles face unlike poles, that is, an N pole of magnet 90 faces an S pole of magnet 92, and so forth. Accordingly, a coil inserted between spaced magnets 90 and 92 comprises a plurality of smaller coils whose width is also similar; that is, each of the smaller coils is of a width correspondent to and substantially the same as the length between three adjacent poles. In addition, as shown in FIG. 9, the inner loops 96 and 97 of each smaller coil overlap one pole of the multiple pole magnet and then the outer loops 98 and 99 extend to overlap one-half of each of the two adjacent unlike poles. Electrically, each pole, such as pole 94, can be regarded as similar to a pair of like poles connected together, as described previously. The dotted lines indicate the center of each pole.

In order to reduce magnetic attraction between the rotating coils and the stationary magnets, it is also within the scope of the invention to place a small iron core at the center of each smaller coil. Each iron core is large enough to reduce or eliminate coil-magnet attraction but small enough so that the inertia of each coil is not substantially affected.

I claim:

1. An electromechanical energy converter comprising:
    a pair of spaced magnetic rows, each row comprising a plurality of magnetic poles of like and unlike polarity with like poles connected in one row and facing connected unlike poles in the other row;
    an electrically conductive coil interposed between the spaced magnetic rows, the coil comprising a plurality of smaller coils, each smaller coil being of a width corresponding to and substantially the same as the length of two connected magnets in a row, each smaller coil comprising a plurality of loops, oriented so that the innermost winding of a smaller coil overlaps connected like poles of two magnets in a row and the outermost winding of the same smaller coil overlaps the remaining two unlike poles of the same magnets, each smaller coil having a pair of output terminals;
    a rotatable shaft extending through the magnetic rows, the conductive coil fastened to the shaft;
    a pair of spaced collector rings located on the shaft away from the magnetic rows and electrically coupled to the coil.

2. The converter of claim 1 wherein the smaller coils are connected in parallel.

3. The converter of claim 1 wherein the smaller coils are connected in series.

4. The converter of claim 1 further defined by a small iron core located at the center of each smaller coil.

5. A coil for an electromechanical energy converter comprising a plurality of windings of electrically conductive material that extend in a spiral-like manner from a relatively narrow inner winding to a relatively wide outer winding, with each intermediate winding between the innermost winding and the outermost winding wider than an adjacent inner winding and narrower than an adjacent outer winding.

6. The coil of claim 5 further defined by a pair of output terminals, one winding coupled to one terminal, and another winding coupled to the other terminal.

7. The coil of claim 6 wherein one output terminal is coupled to the innermost winding of the coil, and the other output terminal is coupled to the outermost winding.

8. The coil of claim 7 wherein the windings thereof extends in a clockwise direction from the innermost to the outermost winding.

9. The coil of claim 5 wherein the windings thereof extend in a counterclockwise direction from the innermost to the outermost winding.

10. Apparatus comprising a plurality of the coils of claim 5 located adjacent to one another in a circular pattern.

11. Apparatus of claim 10 wherein the plurality of coils are electrically coupled in parallel.

12. Apparatus of claim 1 wherein the plurality of coils are electrically coupled in series.

13. Apparatus of claim 10 rotatably mounted in an electromechanical energy converter.

14. Apparatus of claim 10 rotatably mounted between a pair of spaced magnetic rows, each row comprising a plurality of like and unlike poles.

15. Apparatus of claim 14 further defined by a rotatable shaft extending through the pair of magnetic rows with the plurality of coils fastened to the shaft.

16. Apparatus of claim 15 further defined by a pair of spaced collector rings located on the shaft away from the magnetic rows, the rings coupled to the plurality of coils.

17. Apparatus of claim 16, wherein each coil of the plurality is of a width corresponding to and substantially the same as the length between three adjacent magnetic poles of alternating polarity in a magnetic row.

18. Apparatus of claim 17 wherein the innermost winding of each coil overlaps a magnetic pole of one polarity and the outermost winding thereof overlaps one-half of two spaced magnetic poles of opposite polarity adjacent to but spaced apart from the magnetic pole of the one polarity.

* * * * *

UNITED STATES PATENT OFFICE
CERTIFICATE OF CORRECTION

Patent No. 3,624,439          Dated November 30, 1971

Inventor(s) Kiyoshi Tokutomi

It is certified that error appears in the above-identified patent and that said Letters Patent are hereby corrected as shown below:

On the cover sheet [72] 490 N. 8th" should read -- 490 N. 5th --. Column 1, line 32, "would" should read -- wound --. Column 2, line 26, change "REferring" to -- Referring --. Column 6, line 1, "claim 1" should read -- claim 10 --.

Signed and sealed this 14th day of November 1972.

(SEAL)
Attest:

EDWARD M. FLETCHER, JR.
Attesting Officer

ROBERT GOTTSCHALK
Commissioner of Patents